US012637218B2

(12) United States Patent
Schneider et al.

(10) Patent No.: US 12,637,218 B2
(45) Date of Patent: May 26, 2026

(54) ADJUSTABLE WATER SUPPLY SYSTEM AND AIRCRAFT EQUIPPED WITH A WATER SUPPLY SYSTEM

(71) Applicant: Airbus Operations GmbH, Hamburg (DE)

(72) Inventors: Frank Schneider, Hamburg (DE); Hannes Müller, Hamburg (DE); Axel Schreiner, Hamburg (DE); Michael Rempe, Hamburg (DE); Tim Lübbert, Hamburg (DE); Frederik Albers, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 69 days.

(21) Appl. No.: 18/749,695

(22) Filed: Jun. 21, 2024

(65) Prior Publication Data

US 2024/0425198 A1     Dec. 26, 2024

(30) Foreign Application Priority Data

Jun. 22, 2023     (EP) ..................................... 23181036

(51) Int. Cl.
B64D 11/04          (2006.01)
(52) U.S. Cl.
CPC .................................. B64D 11/04 (2013.01)
(58) Field of Classification Search
CPC ......... B64D 11/02; B64D 11/04; B60R 15/00; B60R 15/02; B60R 15/04
See application file for complete search history.

(56) References Cited

U.S. PATENT DOCUMENTS

| | | | | |
|---|---|---|---|---|
| 2013/0298998 A1* | 11/2013 | Nolan | .................. | B01D 35/027 |
| | | | | 137/565.17 |
| 2018/0238765 A1 | 8/2018 | Gramespacher | | |
| 2021/0031923 A1* | 2/2021 | Burd | ..................... | B64D 11/04 |
| 2021/0223799 A1* | 7/2021 | Osborne | .................. | B64F 5/40 |
| 2022/0073206 A1* | 3/2022 | Murayama | .......... | G05D 7/0635 |
| 2022/0342431 A1 | 10/2022 | Schreiner | | |
| 2022/0404228 A1 | 12/2022 | McIntosh | | |
| 2024/0330784 A1* | 10/2024 | Baker | .................. | G06Q 10/025 |

OTHER PUBLICATIONS

Extended European Search Report issued for application No. 23181036.7, dated Dec. 13, 2023, 7 pages.

* cited by examiner

*Primary Examiner* — Reinaldo Sanchez-Medina
(74) *Attorney, Agent, or Firm* — KDW Firm PLLC

(57)          ABSTRACT

A water supply system for an aircraft includes a water supply tank, water consumers, a pressurization unit to convey water from the water supply tank to the water consumers, water consumer supply units, each of the water consumer supply units configured to control water supply from the pressurization unit to one of the water consumers, and a controller. Each of the water consumer supply units is configured to output a consumer signal indicating a water supply of the respective water consumer, wherein the controller is configured to receive the consumer signal of the water consumer supply units and to control a flow rate and/or pressure of the pressurization unit depending on the consumer signal.

20 Claims, 5 Drawing Sheets

ADJUSTABLE WATER SUPPLY SYSTEM AND AIRCRAFT EQUIPPED WITH A WATER SUPPLY SYSTEM

FIELD OF INVENTION

The present disclosure generally relates to an adjustable water supply system for an aircraft and an aircraft having such water supply system. Particularly, the present disclosure relates to a water supply system capable of controlling a pressurization unit conveying water from a water supply tank to a plurality of water consumers, and an aircraft having such water supply system.

BACKGROUND

A conventional water supply system for aircrafts includes a central water tank and water conveying device supplying water to all water consumers in the aircraft. Such water consumers include lavatory monuments (e.g. having a faucet and a toilet) and galleys (e.g. having a faucet, a hot water dispenser, food preparation devices, etc.).

The water conveying device is designed to provide a sufficient amount of water to all water consumers, and provide the necessary overall water pressure. As a mere example, a rinsing nozzle for a toilet usually requires a higher water pressure than a faucet. The water conveying device, however, is designed to provide the maximum water amount and pressure in the aircraft. In addition, at times of a frequent use of water, such as during washing times during a flight, a plurality of water consumers require a sufficient water supply. The central water conveying device, hence, is further designed for this maximum supply (i.e., a maximum amount or flow rate).

Thus, a conventional water supply system for an aircraft is easily overdesigned, which may lead to an increased energy consumption.

SUMMARY

It is therefore an object of the present disclosure to provide an improved water supply system, particularly saving energy and overall weight.

This object is solved by the disclosure and preferred embodiments herein.

According to a first aspect to better understand the present disclosure, a water supply system for an aircraft region comprises a water supply tank, a plurality of water consumers, a pressurization unit configured to convey water from the water supply tank to the plurality of water consumers, and a plurality of water consumer supply units. The plurality of water consumers are connected to the water supply tank via the pressurization unit with corresponding ducts or pipes. Such ducts or pipes are designed to duct water under the pressure induced by the pressurization unit. The pressurization unit can be a pump, such as a unidirectional or reverse water pump, a micro pump a positive displacement pump (e.g., a membrane pump, gear pump, impeller pump) or non-positive displacement pump (e.g., a centrifugal pump) or the like. The pressurization unit can be operated in a forward as well as a reverse mode.

The aircraft region comprises a dedicated number of water consumers. For example, an aircraft region can be a monument, such as a lavatory monument or a galley, or can be a group of monuments, particularly arranged spatially close to one another. This allows sharing the water supply tank between the water consumers in this aircraft region.

Each of the plurality of water consumer supply units is configured to control water supply from the pressurization unit to one of the plurality of water consumers. In other words, the water consumer supply units initiate water supply to the water consumers. For example, each of the plurality of water consumer supply units is configured to output a consumer signal indicating a water supply of the respective water consumer. Thus, each water consumer supply unit can trigger a water supply to a respective water consumer.

Furthermore, the water supply system comprises a controller that is configured to receive the consumer signal of the plurality of water consumer supply units and to control a flow rate and/or pressure of the pressurization unit depending on the consumer signal. Thus, the water supply system provides (conveys) water to a water consumer, only if the consumer signal is output by the respective water consumer supply unit.

As a mere example, an energy supply for the pressurization unit can be adjusted. A low-energy supply to the pressurization unit can lead to a small flow rate and/or low pressure of the water provided by the pressurization unit, while a high energy supply to the pressurization unit can lead to a high flow rate and/or pressure of the water. For instance, a pump speed can be adjusted by the controller.

Since the controller can be made aware of the water consumer (through the output consumer signal), the water supply can be adjusted in view of or adapted to the water consumer. Particularly, the flow rate and/or pressure output by the pressurization unit can be adjusted or preset with respect to the water consumer requesting a water supply. As a mere example, if a faucet is activated, the pressurization unit may provide a lower flow rate than in case of a rinsing nozzle of a toilet bowl being activated. Likewise, if the water consumer is a galley insert, such as a coffeemaker, the controller can be configured to control the pressurization unit with a constant and sufficiently high pressure and flow rate required for the coffeemaker.

Compared to conventional water supply systems, the energy used by the pressurization pump can be significantly reduced, since not the maximum pressure and flow rate is to be provided. For example, in conventional water supply systems faucets have been equipped with aerators and/or pressure regulators, in order to avoid spilling due to too high pressure water output.

With the disclosed water supply system such aerators and/or pressure regulators can be omitted, since the pressurization unit can now be controlled based on the consumer signal. This further reduces maintenance efforts, which usually come with the checking and changing of aerators and/or pressure regulators.

In addition, the water supply system of the present disclosure does not only save energy, but further reduces sound emissions of the pressurization unit, as it does not operate at its maximum level all the time.

In an implementation variant, each of the plurality of water consumer supply units can be coupled to or comprise a water consumer valve configured to activate and deactivate the water supply from the pressurization unit to the respective water consumer. The water consumer supply unit can, for example, control the water consumer valve. For example, the water consumer supply unit can include a sensor and/or switch configured to open and close (activate and deactivate) the water consumer valve. In addition, the sensor and/or switch can further be configured to set an opening degree of the water consumer valve, in order to adjust the water supply (amount and/or flow rate and/or pressure).

Alternatively or additionally, each of the plurality of water consumer supply units is configured to output the consumer signal further indicating the activation or deactivation of the water supply and/or an opening degree of the water consumer valve. Thus, the controller can further be configured to control a flow rate of the pressurization unit depending on the consumer signal, i.e. depending on the activation or deactivation of the water supply, and/or depending on the opening degree of the water consumer valve. Thus, a further optimisation of the water supply can be achieved by correspondingly controlling the pressurization unit (i.e. the flow rate and/or pressure provided by pressurization unit).

Further alternatively or additionally, the water consumer supply unit, particularly a sensor and/or switch of the water consumer supply unit, can generate the consumer signal indicating the activation and deactivation of the water supply and/or a desired opening degree of the water consumer valve. The controller can then be further configured to control the water consumer valve in accordance with the consumer signal. For example, the controller can open the water consumer valve up to a desired opening degree and operate the pressurization unit at a flow rate and/or pressure corresponding to the opening degree (including fully open, which equals an open water consumer valve) or close the water consumer valve. For instance, the controller can be connected to the water consumer valve and transmit a signal to the water consumer valve indicating the opening, opening degree or closing of the water consumer valve. As a mere example, the water consumer valve may include an actuator (e.g., a motor or the like) configured to steplessly open and close the water consumer valve.

Furthermore, if a water consumer supply unit associated with a faucet outputs a consumer signal, the controller can control the water consumer valve to provide a fluid connection between the pressurization unit and the faucet, and to further control the flow rate of the pressurization unit in correspondence with the needs of the faucet. Likewise, more than one water consumer supply unit can output a consumer signal, such as a rinsing switch for a toilet and a switch or sensor of a faucet. In this case, the controller can control the respective water consumer valve to provide a fluid connection between the pressurization unit and the rinsing nozzle of the toilet as well as the faucet, and further to control the flow rate of the pressurization unit in correspondence with the combined needs of the rinsing nozzle and the faucet.

In another implementation variant, the water supply system can further comprise a multiport water supply valve configured to activate and deactivate the water supply from the pressurization unit to one or more of the plurality of water consumers. Such multiport water supply valve can be configured to provide a fluid connection between a supply line from the pressurization unit to one or more supply lines to the water consumers. As a mere example, the multiport water supply valve can be implemented as a shuttle valve.

In any case, the controller can be further configured to control the multiport water supply valve depending on the consumer signal. Thus, the controller can control the multiport water supply valve to allow a fluid connection between the pressurization unit and one or more of the plurality of water consumers depending on the consumer signal. As a mere example, if a water consumer supply unit associated with a faucet outputs a consumer signal, the controller can control the multiport water supply valve to provide a fluid connection between the pressurization unit and the faucet, and to further control the flow rate of the pressurization unit in correspondence with the needs of the faucet. Likewise, more than one water consumer supply unit can output a consumer signal, such as a rinsing switch for a toilet and a switch or sensor of a faucet. In this case, the controller can control the multiport water supply valve to provide a fluid connection between the pressurization unit and the rinsing nozzle of the toilet as well as the faucet, and further to control the flow rate of the pressurization unit in correspondence with the combined needs of the rinsing nozzle and the faucet.

In a further implementation variant, the controller can be configured to control the flow rate and/or pressure of the pressurization unit to a first flow rate and/or a first pressure for a first water consumer of the plurality of water consumers, and to a second flow rate and/or second pressure for a second water consumer of the plurality of water consumers, wherein the second flow rate and/or pressure is larger than the first flow rate and/or pressure. Likewise, the controller can be configured to control the flow rate and/or pressure of the pressurization unit to a third flow rate and/or third pressure, wherein the third flow rate and/or pressure is larger than the first and second flow rate and/or pressure. Thus, different flow rates and/or pressures of the pressurization unit can be achieved depending on the needs of the one or more water consumers requesting a water supply through the respective, associated water consumer supply unit. This allows using only the energy by the pressurization unit required for the present needs (the present requested water supply).

Moreover, the controller can optionally be further configured to control the first and second flow rate and/or pressure of the pressurization unit depending on one or more water consumer parameters. Such consumer parameters can include the type of water consumer (such as faucet, toilet, galley insert, or the like), a water supply request at the water consumer (such as high, medium or low flow rate request), or a priority level of the water consumer (such as high priority to a coffeemaker requesting continuous flow rate and pressure, or medium to high priority to a toilet in business class, etc.). The consumer parameter may further include a filling level of the water supply tank, although the water supply tank is not a consumer. For instance, a load filling level may be an indication for the controller to reduce the first and/or second flow rate and/water pressure.

In yet a further implementation variant, the controller can be configured to control the flow rate of the pressurization unit depending on a type of the water consumer and/or a location of the water consumer in the aircraft, for which the consumer signal is output. Thus, an optimisation of the flow rate can be achieved. As a mere example, some types of water consumers, such as a food or beverage maker, require a constant flow rate and/or pressure of water, in order to properly function. Otherwise, food or beverage may not have the desired quality. This can be taken into account by the controller.

In an implementation variant, the type of the water consumer can include a faucet for a wash basin, a rinse nozzle for a toilet, and a water consuming galley insert in a galley. Such water consuming galley insert can be a coffeemaker, hot water dispenser, steam oven, galley faucet or the like. The controller receiving a consumer signal indicating such type of water consumer can have a predefined flow rate and/or pressure of water to be supplied to such consumer type. As indicated above, some water consumer types are more sensitive to fluctuating water flow rate and/or pressure, so that the controller controls the pressurization unit accordingly, i.e. provides a constant flow rate and/or pressure of water via the pressurization unit. As a mere example, if such a sensitive water consumer requests a water supply, while a further consumer signal is received from another but less sensitive water consumer, the controller may either increase the flow rate and/or pressure of water provided by the pressurization unit, and/or postpone or delay the activation of the less sensitive water consumer until the sensitive water consumer has finished its operation (does not require a dedicated water supply).

Likewise, the location of the water consumer can include a front section, middle section and rear section of the aircraft, a first or business class or economy class installed in the aircraft, lavatory monument, and/or a galley. For instance, the location of the water consumer may result in different priorities given to the associated water consumers. The controller can, hence, control the pressurization unit in order to provide a flow rate and/or pressure of water at each water consumer based on the priority given to the respective water consumer.

Furthermore, if the consumer signal indicates a location in a premium class, such as first or business class, the controller may be configured to control the pressurization unit to provide a higher flow rate and/or pressure of water for all water consumers at this "premium location". This avoids the usually negative personal impression, if the water is supplied with a low flow rate and/or pressure.

Likewise, in economy class, more passengers may require water during washing times, so that the controller can further be configured to control the pressurization unit to provide a higher pressure to compensate an increased overall water consumption.

In another implementation variant, the water supply system can further comprise a further pressurization unit configured to convey water from the water supply tank to the plurality of water consumers. The further pressurization unit (also referred to as a second pressurization unit) is provided in addition to the (first) pressurization unit described so far.

For instance, the further pressurization unit can be connected to the water supply tank in parallel or series with the pressurization unit. A parallel arrangement of the (first and second) pressurization units allows a higher flow rate, if both pressurization units are operating. Multiple pressurization units provided in series, on the other hand, allow increasing the pressure of water supplied by the pressurization units.

Furthermore, the controller can be further configured to control a flow rate and/or pressure of the further pressurization unit individually or simultaneously with the pressurization unit. Particularly, operating the (first and second) pressurization units simultaneously, allows increasing the flow rate and/or pressure of the water supply. Operating the (first or second) pressurization units individually, allows a flow rate and/or pressure of the water supply of a desired value.

Alternatively or additionally, the further pressurization unit can have a different throughput (water supplying power) than the (first) pressurization unit. Thus, operation of one of the (first or second) pressurization units allows providing a predefined flow rate and/or pressure of the water supply.

Further alternatively or additionally, the controller can be configured to control the flow rate and/or pressure of the water conveyed to the plurality of water consumers by activating or deactivating the pressurization unit and/or the further pressurization unit. Thus, a simple control of the supplied water can be achieved by switching on and off one or more pressurization units. As a mere example, one or more power levels of the respective pressurization unit may be predefined. The controller can then activate or deactivate the respective pressurization unit at one of the one or more power levels. This allows achieving any flow rate and/or pressure output by the plurality of pressurization units.

In yet another implementation variant, the water supply system can further comprise a refill valve coupled to a central water supply system and configured to fill water into the water supply tank. As a mere example, the refill valve is fluidly connected to a water pipe of the central water supply system. Opening the refill valve allows refilling the water supply tank. The operation of the refill valve can be controlled by the controller. Particularly, since the controller controls the water supply based on the consumer signal(s), the controller may evaluate or gauge or predict a water level in the water supply tank based on the current water consumption. This allows refilling water into the water supply tank corresponding to the current and/or future needs.

Furthermore, the controller can be configured to control the refill valve, in order to refill the water supply tank. At the same time, the controller can send a corresponding signal to the central water supply system, in order to inform the central water supply system of the demand of refill water.

According to a second aspect to better understand the present disclosure, an aircraft comprises at least one water supply system of the first aspect or one of its variants and/or examples.

In an implementation variant, the aircraft can comprise a central water tank, a central water conveying device configured to convey water to the at least one water supply system, and a central control device connected to the controller and configured to output a central water supply signal. The central control device can be a cabin assignment module operated by a flight attendant for setting certain conditions regarding the cabin of the aircraft. As a mere example, a flight attendant may set the cabin of the aircraft into a sleeping phase mode, where the majority of passengers will sleep. During this time the light of the cabin is usually switched off. The controller of the at least one water supply system can receive a corresponding information signal from the central control device, so that the respective pressurization unit is operated in a low flow rate and/or pressure mode, in order to avoid loud sound emission from the pressurization unit. As a mere example, the information signal from the central control device may be interpreted by the controller to operate the pressurization unit at 90%, 80%, 70% or even 60% for all predefined flow rate and/or pressure values.

It is to be understood that the central control device may operate fully automatically, i.e. without flight attendant involvement.

Furthermore, the central control device can be connected to the controller via a data network or data link provided in the aircraft to communicate data and information between different central controllers, flight attendant panels and/or pilot controls.

Moreover, the controller of the at least one water supply system can be further configured to receive the central water supply signal from the central control device and to control the flow rate and/or pressure of the pressurization unit depending on the central water supply signal. Thus, while the controller of each of the at least one water supply system can have predefined flow rates and/or pressure values for the respective water consumers, such values may be adapted or overwritten depending on the central water supply signal.

In a further implementation variant, the central water supply signal can indicate one or more of a water level of the central water tank, a remaining flight time, a high water consumption time, cabin occupancy, usage frequency of the water consumers, a flight phase, a cabin scenario (such as sleeping, wake up, washing, catering cycle, etc.), a filling level of the water supply tank of the at least one water supply system, an integral over filling levels of all water supply tanks, a filling level of the water supply tank of a prioritized one of the at least one water supply system, the general standard time (UTC), and a venting or rinsing phase of the at least one water supply system. A low water level of the central water tank may result in the controller of each of the at least one water supply system to reduce the flow rate and/or pressure of water supply provided by the pressurization unit. Thus, water can be saved and a situation where the central water tank is empty may be avoided. Likewise, if the remaining flight time is shorter than a predefined threshold, a water saving phase may be started, wherein the controller of each of the at least one water supply system generally reduces a flow rate and/or pressure of water supply provided by the respective pressurization unit. Here, exceptions may again be made depending on the location of the water supply system (e.g., first or economy class) and/or depending on the type of water consumer (e.g., a galley insert).

Furthermore, the central water supply signal can further indicate one or more of time dependent effects of the water supply system and, particularly, the pressurization unit of the at least one water supply system and/or the central water conveying device. For instance, hydraulic restrictions may occur over time (e.g., scaling of an aerator or nozzle, a biofilm deposit, a particle deposit, or the like). Likewise, the pump performance may be reduced over time due to ageing effects. In such case, the central water supply signal received by the controller of the at least one water supply system allows the controller to adapt the operation of the pressurization unit to compensate for such differences.

The central control device can further be configured to control the central water conveying device in accordance with a "soft start", i.e. a speed of the conveying device in accordance with a ramp curve. Likewise, the central water conveying device may be operated in reverse mode, for example, during a drainage of the central water tank and corresponding water system of the aircraft. Alternatively or additionally, the central control device may be configured to control the central water conveying device depending on a reduced performance of the central water conveying device (e.g., due to ageing).

In an implementation variant, the aircraft can comprise one or more monuments. The at least one water supply system can be installed in one of such monuments. A monument can be a lavatory monument having a faucet and a toilet, and/or a galley having a faucet, a hot water dispenser, a food preparation device, or the like.

In another implementation variant, the central control device can further be configured to control the central water conveying device to convey water with a flow rate and/or pressure depending on the number of water consumers of the at least one water supply system currently running (i.e., running at the same time), the total number of water consumers currently running, an integral of a water level of each water supply tank in the at least one water supply system, and/or if one or more water supply tanks have reached a critically low water level, such as below 20% or below 10%, or even an empty tank. This allows keeping a minimum water level buffered in the water supply tank of the at least one water supply system.

Moreover, the central control device can be further configured to control the central water conveying device to convey water with a flow rate and/or pressure depending on one or more water consumer parameters. Such consumer parameters, which can be derived by the central control device from the controller of the at least one water supply system, can include the type of water consumer (such as faucet, toilet, galley insert, or the like) currently requesting water, a water supply request at the water consumer (such as high, medium or low flow rate request), or a priority level of the water consumer (such as high priority to a coffeemaker requesting continuous flow rate and pressure, or medium to high priority to a toilet in business class, etc.).

In addition, the central control device can be further configured to control the central water conveying device on the basis of a filling level of the water supply tank of the at least one water supply system. This can include a prioritization of one or more water supply tanks in case of a plurality of water supply systems. For instance, the water supply tank or tanks with the lowest fill level may receive water via the refill valve. This may include sending a corresponding signal to the controller of the at least one water supply system identifying the priority of the respective water supply system, so that the associated controller refills the water supply tank or waits with the refill process.

Furthermore, it can even be contemplated that a video surveillance unit may determine whether there is a queue in front of one of the lavatories. Alternatively or additionally, statistical data may be provided by a corresponding computing device of the aircraft. Based on such data, one of the at least one water supply system may be prioritized.

A further option for the central control device to control the central water conveying device can be the number of refill valves currently opened at the water supply systems. In other words, if more than one water supply system is currently refilling the associated water supply tank, an increased flow rate and/or pressure can be provided by the central water conveying device.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to example implementations illustrated in the figures, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
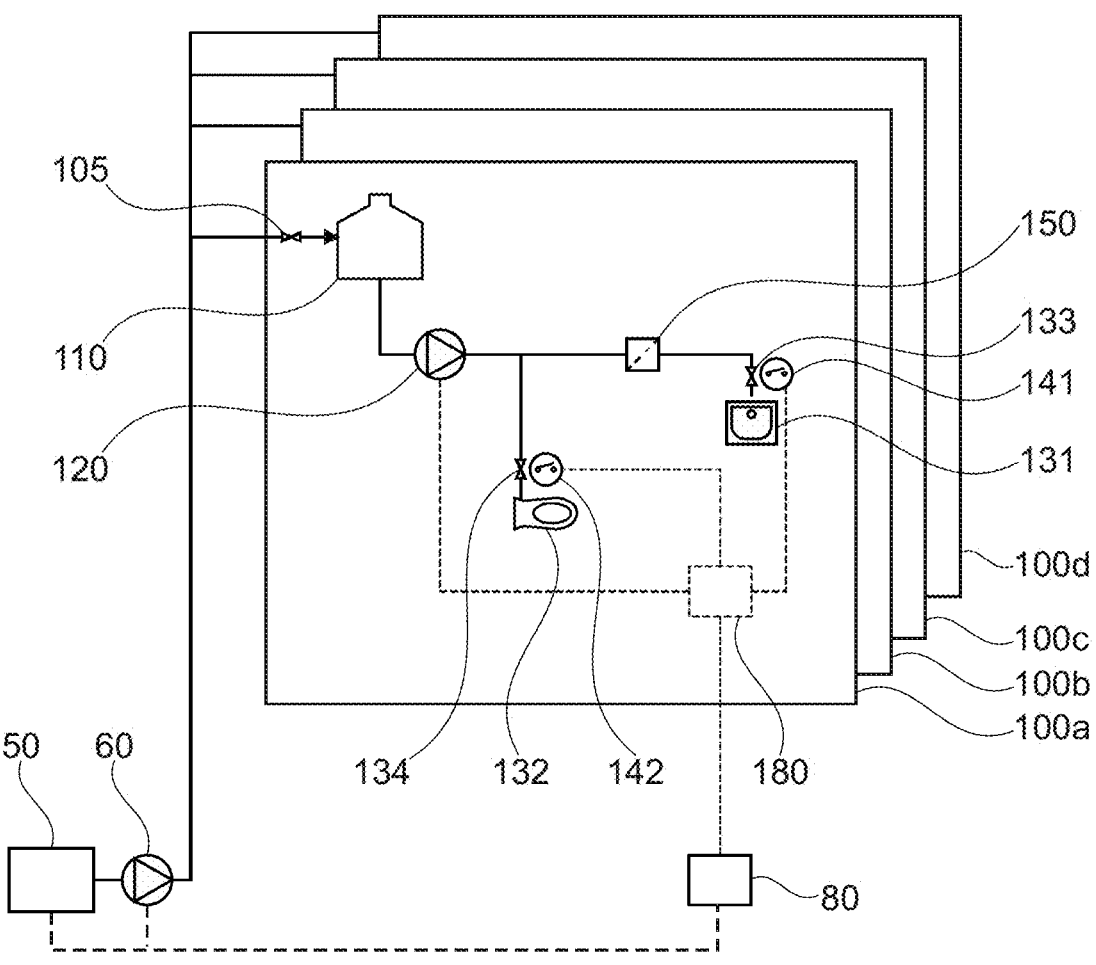
FIG. 1 schematically illustrates a plurality of water supply systems.

FIG. 1 schematically illustrates a plurality of water supply systems 100*a-d*, wherein one water supply system 100*a* is illustrated in more detail. For instance, each water supply system 100*a-d* may be associated with a particular water consumer, group of water consumers and/or monument in an aircraft. Water supply system 100*a*, for example, can be associated with a lavatory monument. Water supply systems 100*b-d* can respectively be associated with a further lavatory monument, a galley, a washroom including a shower, a water dispenser niche and the like. The components described with respect to the water supply system 100*a*, or at least a subgroup of these components, may also be included in the other water supply systems 100*b-d*.

For example, the water supply system 100 comprises a water supply tank 110 storing or buffering a certain amount of water associated with the water supply system 100. As a mere example, as a galley may require more water in a particular time period during which food and beverages are provided, the water supply tank 110 may be designed larger than in a water supply system 100*a* for a lavatory, but smaller than in a water supply system 100 for a washroom including a shower (not illustrated).

The water supply tank 110 may be filled with water from a central water supply system, for example, from a central water tank 50 and by a water conveying device 60 and corresponding ducts and pipes distributing the water from the water conveying device 60 to the different water supply systems 100. For instance, by opening a refill valve 105 coupled to the central water supply system, the water supply tank 110 can be filled with water. It is to be understood that a fill level reached by the filling of the water supply tank 110 may depend on different parameters, including the priority given to the water supply system (galley, business class lavatory, etc.) and/or a filling level of the central water tank 50. As a mere example, if the central water tank 50 has a fill level of 20% or less, low priority water supply systems 100 may not be re-filled or may only be filled with less water. In this regard, the central water tank 50 may include a water level sensor (not explicitly illustrated).

The water supply system 100 further comprises a plurality of water consumers, such as a washbasin 131 or faucet and a toilet bowl 132 or rinsing nozzle (not individually illustrated). Each of the plurality of water consumers 131, 132 is fluidly connected to the water supply tank 110 via a respective pipe or duct as illustrated.

The water supply system 100 includes a pressurization unit 120 configured to convey water from the water supply tank 110 to the plurality of water consumers 131, 132. For instance, downstream of the pressurization unit 120, a distributing piping or ducting may be provided, having pipe or duct branches to each of the plurality of water consumers 131, 132.

Furthermore, a plurality of water consumer supply units 141, 142 are provided in the water supply system 100. Each water consumer supply unit 141, 142 is configured to control a water supply from the pressurization unit 120 to a respective one of the plurality of water consumers 131, 132 and is further configured to output a consumer signal indicating a water supply of the respective water consumer 131, 132. In the illustrated example, a water consumer supply unit 141 is associated with a water consumer 131, here an example washbasin, usually having a faucet (not individually illustrated). If a passenger requires water from the faucet, a sensor or switch is activated by the passenger, in order to start a water supply. This sensor or switch can be integrated into the water consumer supply unit 141.

The water supply system 100 further comprises a controller 180 that is electrically and/or electronically coupled (illustrated as dashed lines) to at least the plurality of water consumer supply units 141, 142. Thus, when the water consumer supply unit 141 outputs the consumer signal, for example, due to activation of a faucet (sensor or switch) by the passenger, the controller is configured to receive the consumer signal and to control a flow rate and/or pressure of the pressurization unit 120 depending on the consumer signal. Thus, the pressurization unit 120 can be operated only when the consumer signal is received by the controller 180, and the pressurization unit 120 can be operated in an optimised manner for the activated water consumer(s) 131, 132. It is to be understood that the pressurization unit 120 and/or the water consumer supply units 141, 142 may be remotely controlled. For instance, remotely controlling can be achieved by a central control device 80, e.g., connected to the controller 180 via an aircraft data network. Such remote control may be performed during a disinfection of the water supply system, maintenance, tests or the like.

Moreover, the controller 180 may have stored a predefined water supply, i.e. may have stored which consumer receives a specific water supply (flow rate and/or pressure). This predefined water supply may include a (hardcoded) default value for the flow rate and/or pressure required by the respective water consumer. In addition, the predefined water supply may be retrieved from a general data and/or information centre (not illustrated). It is to be understood that the predefined water supply (values) can be programmed into the controller 180 any time, for example, by a flight attendant or a more general aircraft system.

On the other hand, the controller 180 can be further configured to control the flow rate and/or pressure of the pressurization unit 120 to be a first flow rate and/or pressure for a first water consumer (e.g., washbasin 131), and to a second flow rate and/or pressure for a second water consumer (e.g. rinsing nozzle of toilet bowl 132). Since each water consumer can be related to a different predefined water supply (flow rate and/or pressure), the first and second flow rate and/or pressure can be different. As a mere example, the second water consumer 132 may require a higher flow rate and/or higher water pressure for rinsing and cleaning the toilet bowl. Thus, the controller 180 may provide a higher second flow rate and/or pressure for the second water consumer 131 by operating the pressurization unit 120 at a higher level.

For instance, the power of the pressurization unit 120 can be adjusted by the controller 180 according to the predefined water supply linking the water consumer arrangement with an associated water supply rate. The power control of the pressurization unit 120 can include adaptation of an electrical input (voltage, current, frequency, pulse width modulation, etc.) to the pressurization unit 120.

It is to be understood that the controller 180 can be further configured to control the flow rate and/or pressure of the pressurization unit 120 in accordance with dependencies on other parameters, such as which water consumers are currently running (at the same time) or the like. Furthermore, the controller 180 can be further configured to control the flow rate and/or pressure of the pressurization unit 120 depending on a filling level of the water supply tank 110. For instance, depending on the filling level, a flow rate could be reduced, such as below 30% or below 20% filling level.

FIG. 1 illustrates a plurality of example water consumer valves 133, 134 respectively arranged in a branch of the pipe or duct network downstream of the pressurization unit 120. Each water consumer valve 133, 134 can be configured to activate and deactivate the water supply from the pressurization unit 120 to the respective water consumer 131, 132. The control of the water consumer valves 133, 134 can be performed by the associated water consumer supply unit 141, 142. The associated water consumer supply unit 141, 142 can output the consumer signal as further indicating the activation or deactivation of the water supply (i.e., an open or closed valve 133, 134) and/or an opening degree of the water consumer valve 133, 134. This allows the controller 180 to operate the pressurization unit 120 in accordance with the water consumer valve 133, 134.

Alternatively, each water consumer valve 133, 134 is controlled by the controller 180 depending on the consumer signal received from the water consumer supply unit 141, 142. Thus, the controller 180 can control water supply through the pressurization unit 120 in interaction with the opening and closing of the water consumer valve(s) 133, 134.

In any case, the passenger will not notice any difference of the actual water supply compared to conventional water supply systems. Nevertheless, the water supply system 100 of the present disclosure will lead to less sound emission, i.e. a quieter water supply, as well as less energy consumption.

Moreover, the water supply system 100 may further comprise an optional water filter 150, e.g., upstream of the faucet for the washbasin 131. The controller 180 may hold a predefined first water supply (flow rate and/or pressure) for the faucet for the washbasin 131 as well as a predefined second water supply for the combination of water filter 150 and faucet for the washbasin 131. The second water supply may be larger (e.g., higher flow rate and/or higher pressure) in order to compensate any pressure drop in a specific water consumer arrangement, such as the water filter 150 plus faucet for the washbasin 131. The controller 180 may further be provided with information about a type of water filter 150, in order to compensate any pressure drop specific to the type of water filter 150.

The same applies to the type of water consumer 131, 132. Besides the already described faucet for a washbasin 131 and rinsing nozzle for a toilet bowl 132, the water consumers 131, 132 may further include a galley insert (GAIN) in a galley (e.g., being part of a further water supply system 100*b*-*d*), such as a coffeemaker, hot water dispenser, steam oven, etc.

Figure 2:
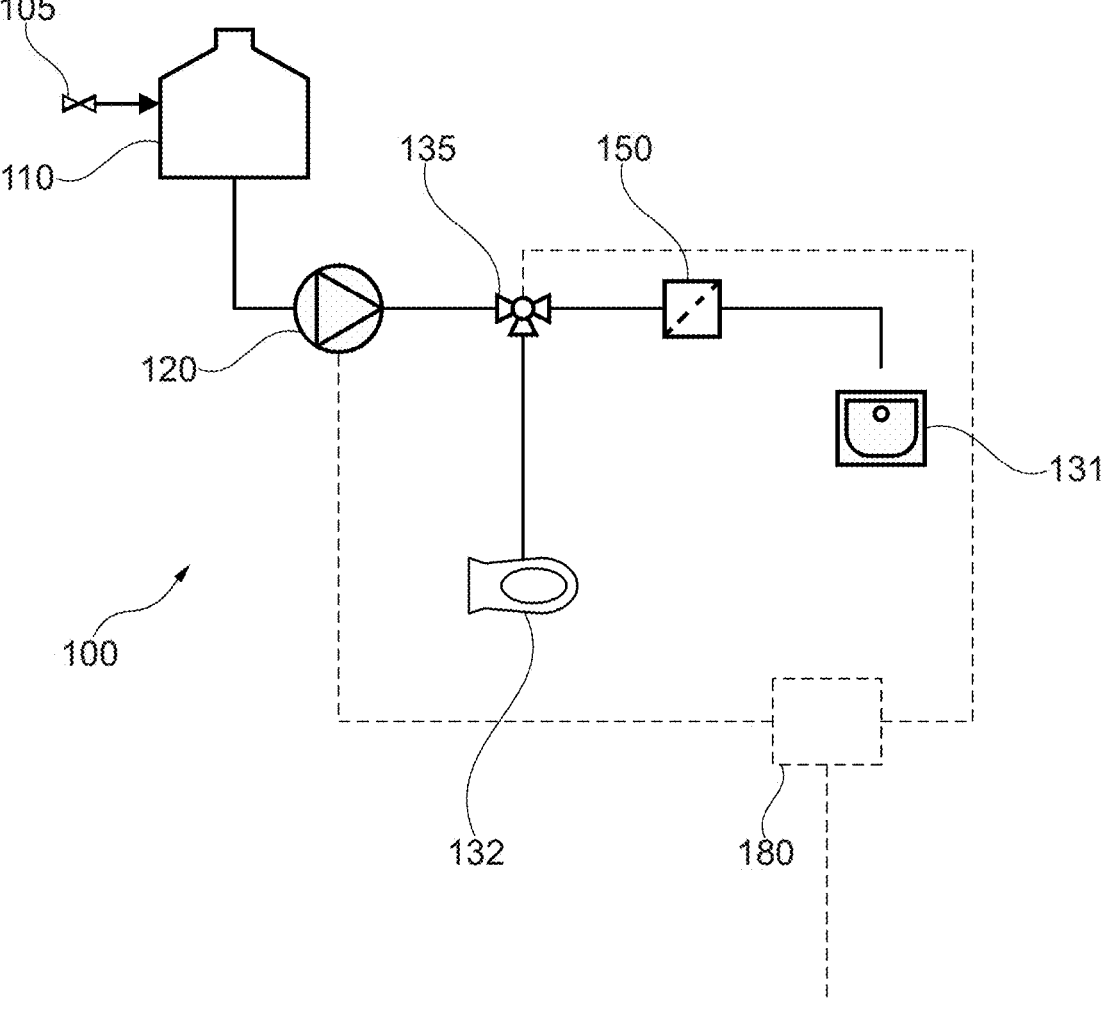
FIG. 2 schematically illustrates an example water supply system.

FIG. 2 illustrates another example water supply system 100. Components of the water supply system 100 already illustrated in and explained with respect to FIG. 1 will not be described again, for the sake of brevity. Same components are indicated by the same reference numerals.

The water supply system 100 of FIG. 2 includes a multiport water supply valve 135 configured to activate and deactivate the water supply from the pressurization unit 120 to one or more of the plurality of water consumers 131, 132. For instance, the multiport water supply valve 135 (e.g., a shuttle valve) can be configured to distribute water from the pressurization unit 120 to one or more pipe or duct branches leading to the water consumers 131, 132.

The controller 180 can be further configured to control the multiport water supply valve 135 depending on the consumer signal. In other words, the consumer signal, as explained above, indicates a water supply of a respective water consumer 131, 132 (or of more than one water consumer 131, 132), so that the controller 180 can open the multiport water supply valve 135 with respect to the corresponding pipe or duct branch(es).

This water supply system 100 allows omission of individual water consumer valves 133, 134, which reduces the overall complexity of the water supply system. The control of the water supply system 100 via controller 180 may be performed in the same manner as explained with respect to FIG. 1, with the exception of controlling the multiport water supply valve 135 instead of the individual water consumer valves 133, 134.

Figure 3:
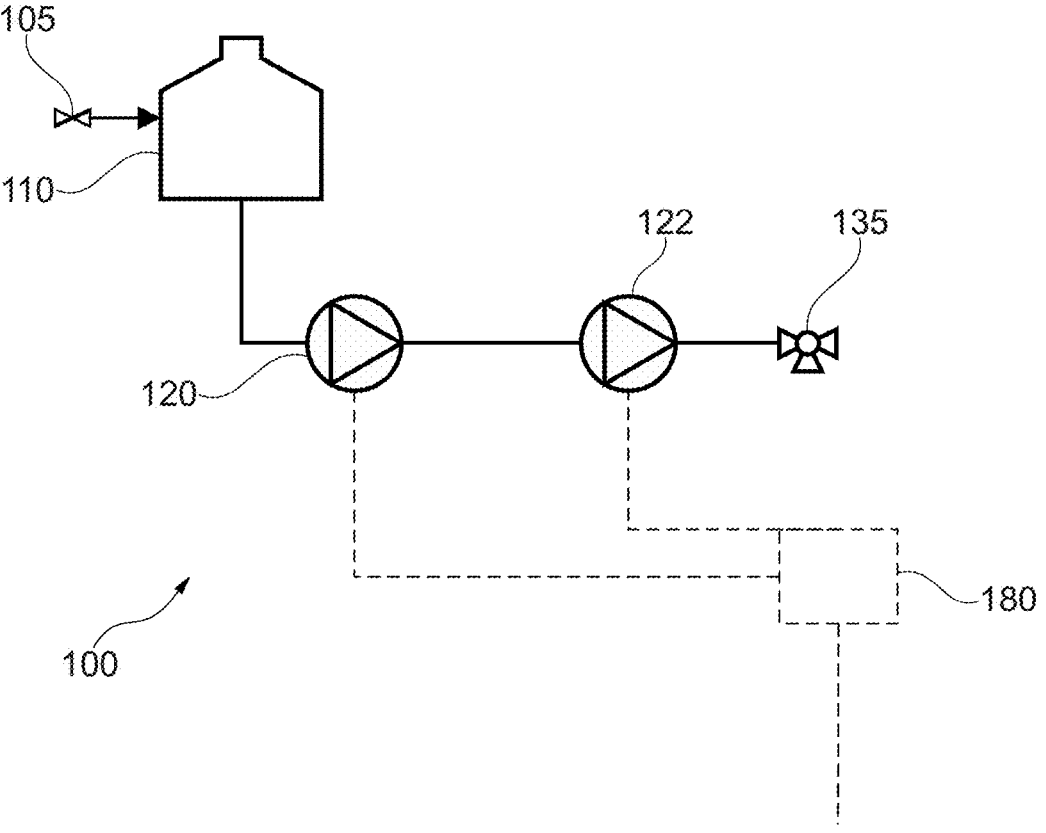
FIG. 3 schematically illustrates another example water supply system.

FIG. 3 illustrates a portion of a further example water supply system 100. Components of the water supply system 100 already illustrated in and explained with respect to FIG. 1 or 2 will not be described again, for the sake of brevity. Same components are indicated by the same reference numerals.

The further example water supply system 100 is equipped with a further (second) pressurization unit 122 connected to the water supply tank 110 in series with the (first) pressurization unit 120. The (first) pressurization unit 120 can be the one illustrated and described with respect to FIGS. 1 and 2. Thus, an additional (second) pressurization unit 122 is provided. This allows increasing the pressure of the water supply downstream of the first and second pressurization units 120, 122. The second pressurization unit 122 can likewise be controlled by the controller 180, particularly the flow rate and/or pressure of the further pressurization unit 122 can be individually or simultaneously be controlled with the (first) pressurization unit 120 by the controller 180.

Figure 4:
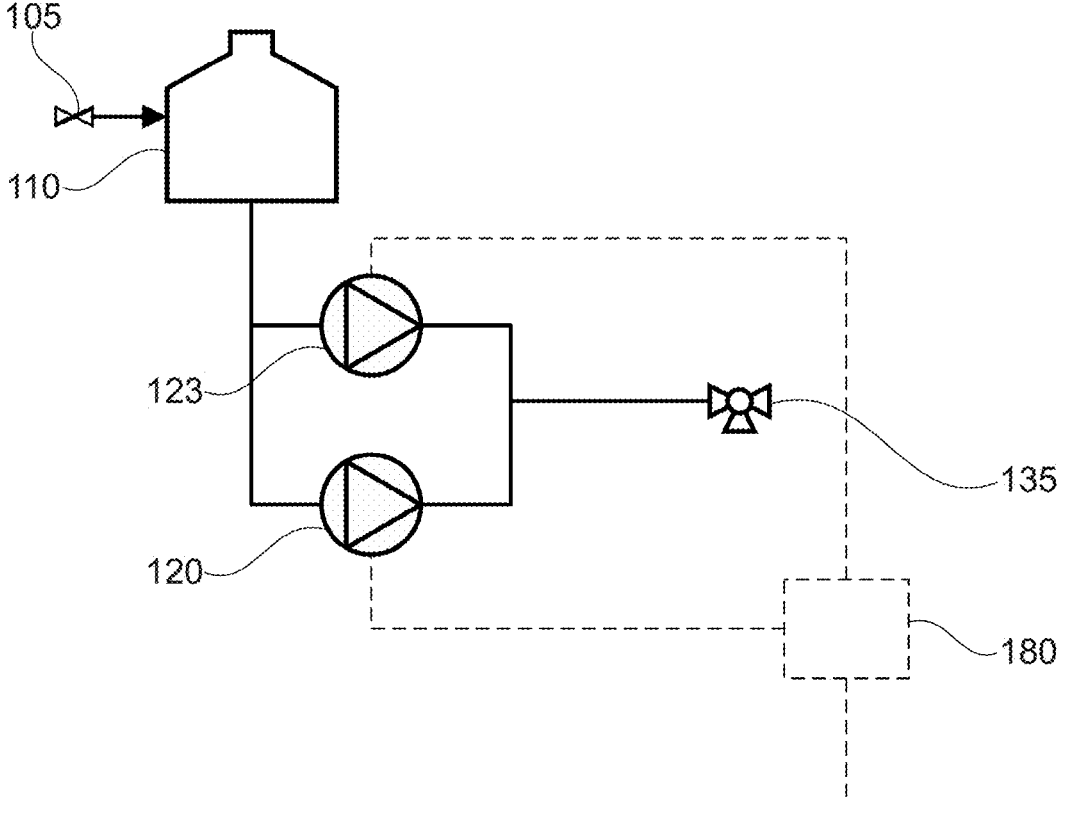
FIG. 4 schematically illustrates a further example water supply system.

FIG. 4 illustrates a portion of a further example water supply system 100. Components of the water supply system 100 already illustrated in and explained with respect to FIG. 1 or 2 will not be described again, for the sake of brevity. Same components are indicated by the same reference numerals.

The further example water supply system 100 is equipped with a further (second) pressurization unit 123 connected to the water supply tank 110 parallel to the (first) pressurization unit 120. The (first) pressurization unit 120 can be the one illustrated and described with respect to FIGS. 1 and 2. Thus, an additional (second) pressurization unit 123 is provided. This allows increasing a flow rate of the water supply downstream of the first and second pressurization units 120, 123. The second pressurization unit 123 can likewise be controlled by the controller, particularly the flow rate at/or pressure of the further pressurization unit 123 can be individually or simultaneously be controlled with the (first) pressurization unit 120 by the controller 180.

Thus, in view of each of the water supply systems 100 of FIGS. 3 and 4, the respective controller 180 can be configured to adjust the water supply to the water consumers 131, 132 not only by adaptation of the electrical input of the (first) pressurization unit 120, but also by activation of a specific number of pressurization units 120, 122, 123. For instance, the (second) pressurization unit 122, 123 can be controlled by adaptation of an electrical input (voltage, current, frequency, pulse width modulation, etc.).

Although FIGS. 3 and 4 illustrate a multiport water supply valve 135, it is to be understood that the (second) pressurization unit 122, 123 can likewise be employed in the water supply system 100 of FIG. 1 comprising water consumer valves 133, 134.

It is further to be understood that a combination of the water supply systems 100 of FIGS. 3 and 4 is likewise possible. Thus, at least three pressurization units 120, 122, 123 can be arranged in a water supply system 100, wherein one pair of pressurization units 120, 122 is connected in series to one another, while another pair of pressurization units 120, 123 is connected parallel to one another.

Figure 5:
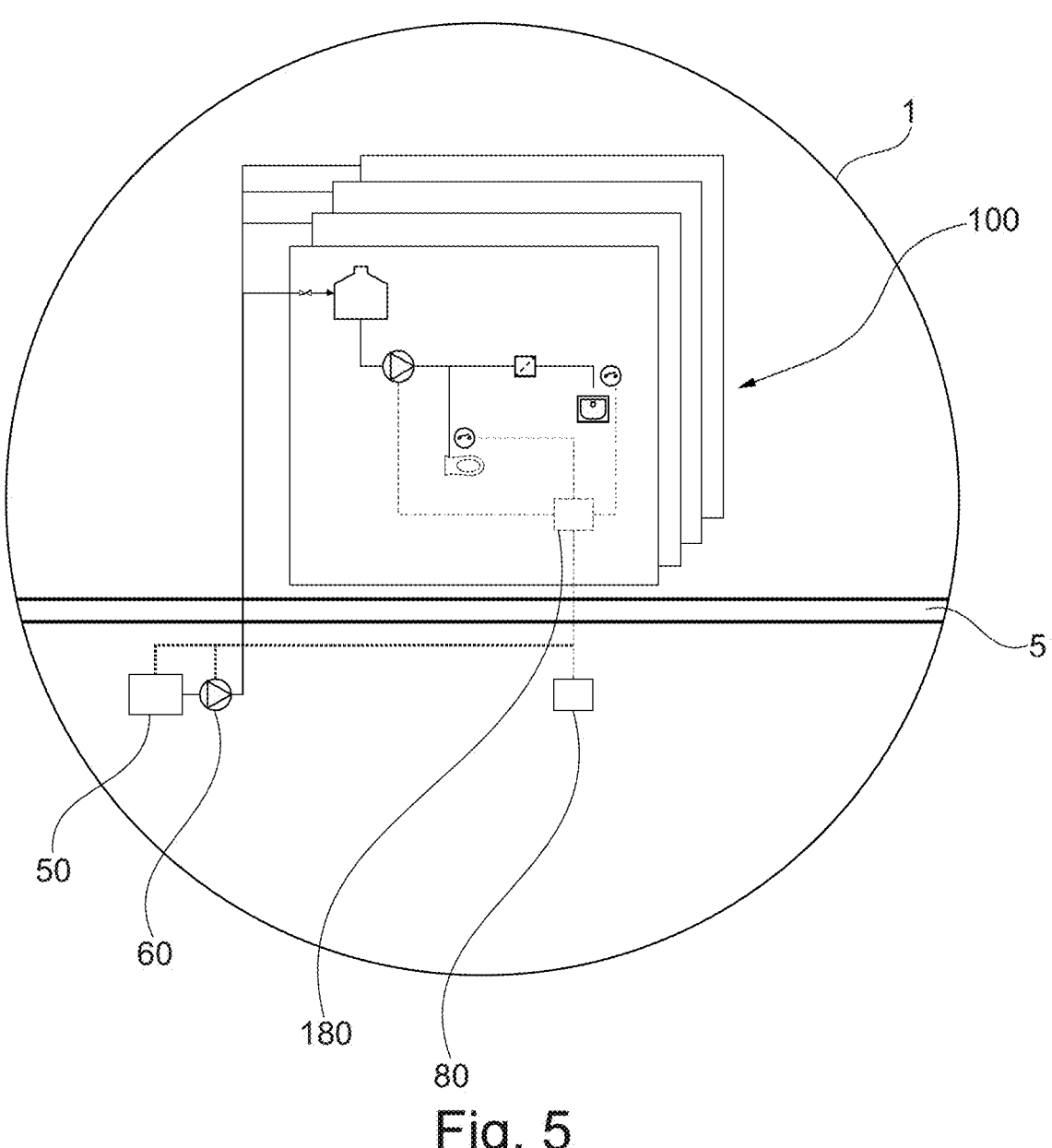
FIG. 5 schematically illustrates an aircraft comprising a plurality of water supply systems.

FIG. 5 schematically illustrates an aircraft 1 comprising at least one water supply system 100. This at least one water supply system 100 can be any of the water supply systems 100*a*-*d* illustrated and described with respect to one of FIGS. 1 to 4.

The aircraft 1 is equipped with a central water supply system including a central water tank 50 and central water conveying device 60. Furthermore, the aircraft 1 can have a plurality of monuments or other structures requiring water supply, such as one or more galleys, one or more lavatories, one or more washrooms, etc. Each of these monuments or structures includes a respective water supply system 100*a-d* having the water consumers required for the monument or structure.

In addition, the aircraft can comprise a central control device 80 connected to the controller 180 of each of the water supply systems 100. The central control device 80 can be configured to output a central water supply signal. This central water supply signal can indicate one or more of a water level of the central water tank 50, a remaining flight time, a high water consumption time, cabin occupancy, usage frequency of the water consumers, the general standard time (UTC), and a venting or rinsing phase of the at least one water supply system 100.

The controller 180 of the at least one water supply system 100 can further be configured to receive the central water supply signal from the central control device 80 and to control the flow rate of the respective pressurization unit 120 depending on the central water supply signal. This may include that the central water supply signal overwrites any predefined settings in the controller 180 and/or that the controller 180 adjusts any predefined setting in the controller 180 based on the central water supply signal. For example, during start-up and/or venting/rinsing phase of the central water system and/or one or more of the plurality of water supply systems 100, the respective controller 180 can operate the respective pressurization units 120 to fulfil the start-up requirements and/or venting/rinsing air or water supply.

Moreover, the central control device 80 may be coupled to a cabin attendant panel or include a cabin attendant interface, which allows a cabin attendant to perform certain water supply settings. As a mere example, a water boost function may be initiated via the central control device 80. For instance, on long haul flights the faucet flow rate (at a wash basin 131) can be increased for washing periods (e.g. after food and beverage service, after sleeping phases, etc.) while it is reduced for the remaining time. This allows a controllable water-saving feature. As a mere example, the central control device 80 can be connected to an aircraft data network, so that all required information (e.g., flight phase, lavatory data, galley data, etc.) can be retrieved via the aircraft data network. In addition, the central control device 80 may be programmed to automatically control the central water conveying device 60 as well as the at least one water supply system 100, in order to reduce a workload of the cabin attendants.

Furthermore, depending on a water level in the central water tank 50 and/or a remaining flight time, the water supply provided by the central water conveying device 60 as well as the respective pressurization units 120 of the water supply systems 100 can be reduced, in order to save water.

It is believed that the advantages of the technique presented herein will be fully understood from the foregoing description, and it will be apparent that various changes may be made in the form, constructions and arrangement of the example aspects thereof without departing from the scope of the disclosure or without sacrificing all of its advantageous effects. Because the technique presented herein can be varied in many ways, it will be recognized that the disclosure should be limited only by the scope of the claims that follow.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A water supply system for an aircraft region, the water supply system comprising:
   a water supply tank;
   a plurality of water consumers;
   a pressurization unit configured to convey water from the water supply tank to the plurality of water consumers;
   a plurality of water consumer supply units, each of the plurality of water consumer supply units being configured to:
      control conveyance of the water from the pressurization unit to a corresponding water consumer of the plurality of water consumers; and
      output a consumer signal indicating a water supply of the corresponding water consumer; and
   from each of the water consumer supply units
   a controller configured to receive the consumer signal from each of the plurality of water consumer supply units to adjust an energy supply for the pressurization unit, thereby controlling a flow rate and/or a pressure of the pressurization unit based on the consumer signal for each of the plurality of water consumers that are supplied with the water by the pressurization unit.

2. The water supply system of claim 1, wherein:
   each of the plurality of water consumer supply units is coupled to or comprises a water consumer valve configured to activate and deactivate the water supply from the pressurization unit to the respective water consumer; and
   each of the plurality of water consumer supply units is configured to output the consumer signal further indicating activation or deactivation of the water supply and an opening degree of the water consumer valve.

3. The water supply system of claim 1, comprising:
   a multiport water supply valve configured to activate and deactivate the water supply from the pressurization unit to one or more of the plurality of water consumers;
   wherein the controller is configured to control the multiport water supply valve depending on the consumer signal.

4. The water supply system of claim 1, wherein:
   the controller is configured to control the flow rate and/or the pressure of the pressurization unit to a first flow rate and/or a first pressure for a first water consumer of the plurality of water consumers, and to a second flow rate and/or a second pressure for a second water consumer of the plurality of water consumers, wherein the second flow rate and/or the second pressure is larger than the first flow rate and/or the first pressure; and
   the controller is configured to control the first flow rate and/or the first pressure and/or second flow rate and/or the second pressure of the pressurization unit depending on one or more water consumer parameters.

5. The water supply system of claim 1, wherein the controller is configured to control the flow rate and/or the pressure of the pressurization unit depending on a type of the water consumer and/or a location of the water consumer in the aircraft, for which the consumer signal is output.

6. The water supply system of claim 5, wherein:
the type of the water consumer includes a faucet for a wash basin, a rinse nozzle for a toilet, and a water consuming galley insert in a galley; and/or
the location of the water consumer in the aircraft includes a front section, middle section, and rear section of the aircraft, a first class, a business class, or an economy class installed in the aircraft, and/or a galley.

7. The water supply system of claim 1, comprising a refill valve coupled to a central water supply system and configured to fill water into the water supply tank.

8. The water supply system of claim 1, comprising:
a further pressurization unit configured to convey water from the water supply tank to the plurality of water consumers;
wherein the further pressurization unit is connected to the water supply tank in parallel er series with the pressurization unit;
wherein the controller is configured to control a flow rate and/or a pressure of the further pressurization unit simultaneously with the pressurization unit; and
wherein the controller is configured to control the flow rate and/or the pressure of the water conveyed to the plurality of water consumers by activating or deactivating the pressurization unit and/or the further pressurization unit, at one or more predefined power levels of the pressurization unit and of the further pressurization unit, respectively.

9. The water supply system of claim 1, comprising:
a further pressurization unit configured to convey water from the water supply tank to the plurality of water consumers;
wherein the further pressurization unit is connected to the water supply tank in series with the pressurization unit;
wherein the controller is configured to control a flow rate and/or a pressure of the further pressurization unit simultaneously with the pressurization unit; and
wherein the controller is configured to control the flow rate and/or the pressure of the water conveyed to the plurality of water consumers by activating or deactivating the pressurization unit and/or the further pressurization unit, at one or more predefined power levels of the pressurization unit and of the further pressurization unit, respectively.

10. The water supply system of claim 1, wherein each of the plurality of water consumer supply units is coupled to or comprises a water consumer valve configured to activate and deactivate the water supply from the pressurization unit to the respective water consumer.

11. The water supply system of claim 1, wherein each of the plurality of water consumer supply units is configured to output the consumer signal further indicating activation or deactivation of the water supply.

12. The water supply system of claim 1, wherein:
each of the plurality of water consumer supply units is coupled to or comprises a water consumer valve configured to activate and deactivate the water supply from the pressurization unit to the respective water consumer; and
each of the plurality of water consumer supply units is configured to output the consumer signal further indicating activation or deactivation of the water supply and/or an opening degree of the water consumer valve.

13. An aircraft comprising at least one of the water supply system of claim 1.

14. The aircraft of claim 13, comprising:
a central water tank;
a central water conveyor configured to convey water to the water supply system; and
a central controller connected to the controller and configured to output a central water supply signal;
wherein the controller of the at least one water supply system is configured to receive the central water supply signal from the central controller and to control the flow rate and/or the pressure of the pressurization unit of a same one of the at least one water supply system depending on the central water supply signal.

15. The aircraft of claim 14, wherein the central water supply signal indicates one or more of a water level of the central water tank, a remaining flight time, a high water consumption time, cabin occupancy, usage frequency of the water consumers, and a venting or rinsing phase of the at least one water supply system.

16. The aircraft of claim 14, wherein the at least one water supply system is installed in a monument.

17. The aircraft of claim 16, wherein the central controller is configured to control the central water conveyor to convey water with a flow rate and/or a pressure depending on a quantity of the plurality of water consumers of the water supply system that are currently running, a total quantity of the plurality of water consumers currently running in each of the at least one water supply system, and an integral of a water level of each water supply tank in the at least one water supply system.

18. The aircraft of claim 14, wherein the at least one water supply system is installed in a lavatory monument having a faucet and a toilet.

19. The aircraft of claim 14, wherein the at least one water supply system is installed in a galley having a faucet, a hot water dispenser, and one or more food preparation devices.

20. The aircraft of claim 16, wherein the central controller is configured to control the central water conveyor to convey water with a flow rate and/or a pressure depending on a quantity of the plurality of water consumers of the at least one water supply system that are currently running, a total quantity of the plurality of water consumers currently running in each of the at least one water supply system, and/or an integral of a water level of each water supply tank in the at least one water supply system.

* * * * *